INVENTOR
WILLIAM M. EWART
JOHN H. KLASEY.
ATTORNEY

Patented June 13, 1944

2,351,027

UNITED STATES PATENT OFFICE 2,351,027

METHOD OF TESTING CARBURETORS

William M. Ewart, Webster Groves, and John H. Klasey, St. Louis, Mo., assignors to Carter Carburetor Corporation, St. Louis, Mo., a corporation of Delaware Original application June 15, 1940, Serial No. 340,850. Divided and this application February 21, 1942, Serial No. 431,848

1 Claim. (Cl. 73—51)

This invention relates to an improved method of testing carburetors. More specifically, the invention is chiefly intended for use in flow testing carburetors for the purpose of quickly locating any cause of faulty operation, and it is especially applicable to the testing of carburetors while on the engines in garages and service stations without the necessity of road testing or sending the carburetors to the factory laboratories where the complicated and expensive machinery for standard flow testing may be found.

This application is a division of our co-pending application, Serial No. 340,850, filed June 15, 1940.

For the purpose of determining whether faulty operation of any particular automobile may be ascribed to the carburetor, it is usually sufficient to determine two factors: First, the mixture ratio or the proportion of air and gasoline delivered by the carburetor under part throttle conditions and, second, the fuel mixture ratio delivered by the carburetor under wide open throttle conditions. These two factors are sufficient to give substantially complete information as to the constant speed functioning of the carburetor, and if taken at a sufficient number of points in the range, will result in the development of a complete flow curve of the carburetor.

We are not concerned here with such temporary changes in the ratio as may be made when the speed of the engine is changed. However, under special temperature conditions, such as would be encountered in cranking the engine at low speeds, the choke being closed for the purpose, a separate and distinct constant speed flow condition is encountered, which may be obtained by testing with the use of our invention. Ordinarily, the development of a complete flow curve is not at all necessary in checking a particular carburetor to determine whether its passages are clogged up or whether its constant speed operation is faulty.

The use of the complete flow curve is mainly in the design and development of new carburetors. The carburetor must be developed to the point where it has been accepted by the motor car manufacturer and adopted as standard equipment, other carburetors of the same design may be quickly tested for faulty operation by taking a single point in the part throttle curve and a single point in the wide open throttle curve.

Previously, it has been difficult or impossible to obtain these points in the part of wide open throttle curves with machinery which could be used by the service men found in garages and repair shops. The equipment previously available is much too expensive and complicated for use except in a laboratory of highly trained men, and testing even under these conditions would be so expensive that it would be cheaper to buy a new carburetor rather than to test the old one.

Even road testing with a volumetric fuel tank is unsatisfactory, because such a test involves the operation of practically the whole automobile, including tires, gears, engine, difference in oil, temperatures, valves, and other variables too numerous to mention.

Flow testing of a carburetor installed on an engine has not previously been practical because of the impossibility of getting a substantially open throttle condition with the engine running light on the floor, and while the engine is a satisfactory source of suction for flow testing, it is impossible to use it in this way because of the extremely high speeds and strain to which it would be subjected when the throttle is substantially open. While it would be possible to build a motor driven vacuum pump of sufficient size and capacity to operate the carburetor under wide open throttle conditions, or to brake down the engine speed, a flow stand equipped with a motor and pump of this size would be rather expensive for use in the ordinary service station and braking cannot be done conveniently with the engine mounted in a vehicle.

A feature of our invention is the provision of a flow restricting device having accurately adjustable means to restrict the flow from the carburetor so that the carburetor throttle may be left in wide open position to obtain a point on the wide open curve while using the engine as a pump without pouring such a volume of fuel mixture into the engine as would cause it to be injured by racing. This device is also usable in a flow stand separate from the engine and by its use, it is possible to employ a much smaller motor and pump than would be required to operate the carburetor at its full capacity.

It will be understood that many factors, other than constant speed flow operation, enter into the performance of the carburetor. For instance, the accelerating pump, the mechanical or suction operated step-up, the thermostat of the choke control, and others. However, the experienced mechanic will ordinarily recognize from the nature of the complaint whether the fault is likely to be found in these other devices.

The testing of the idle system being a constant speed operation requiring high vacuum, but very little volume, can be done by the use of our invention. It will also be understood that the idle system merges into the part throttle operation as the speed is increased.

The testing of a wide open throttle position of a carburetor while on the engine without our device is quite impossible as the engine would attain a speed that is undesirable for testing and at the same time would be injurious if sustained for an appreciable time.

To check the speed of an engine, to an R. P. M. that is not injurious when sustained for a sufficient period of time with the throttle wide open, it has been found advantageous to accurately restrict the flow of mixture from the carburetor to the intake manifold. By placing a restriction between the carburetor and intake manifold, the carburetor will duplicate the function of a carburetor on a car operating under a load at a given speed at wide open throttle.

An object of this invention is to provide a novel means for accurately limiting the volume of mixture entering the intake manifold at wide open throttle.

Another object of the invention is to provide a device for adapting the engine to function as a suction pump for flow testing of a carburetor.

Another object is to provide a device that is portable, simple in operation, and economical to manufacture. To better understand the invention and its operation, reference is made to the accompanying drawings in which:

Fig. 8 is an enlarged sectional view of the calibrated end of the metering rod and its associated parts.

Figure 1:
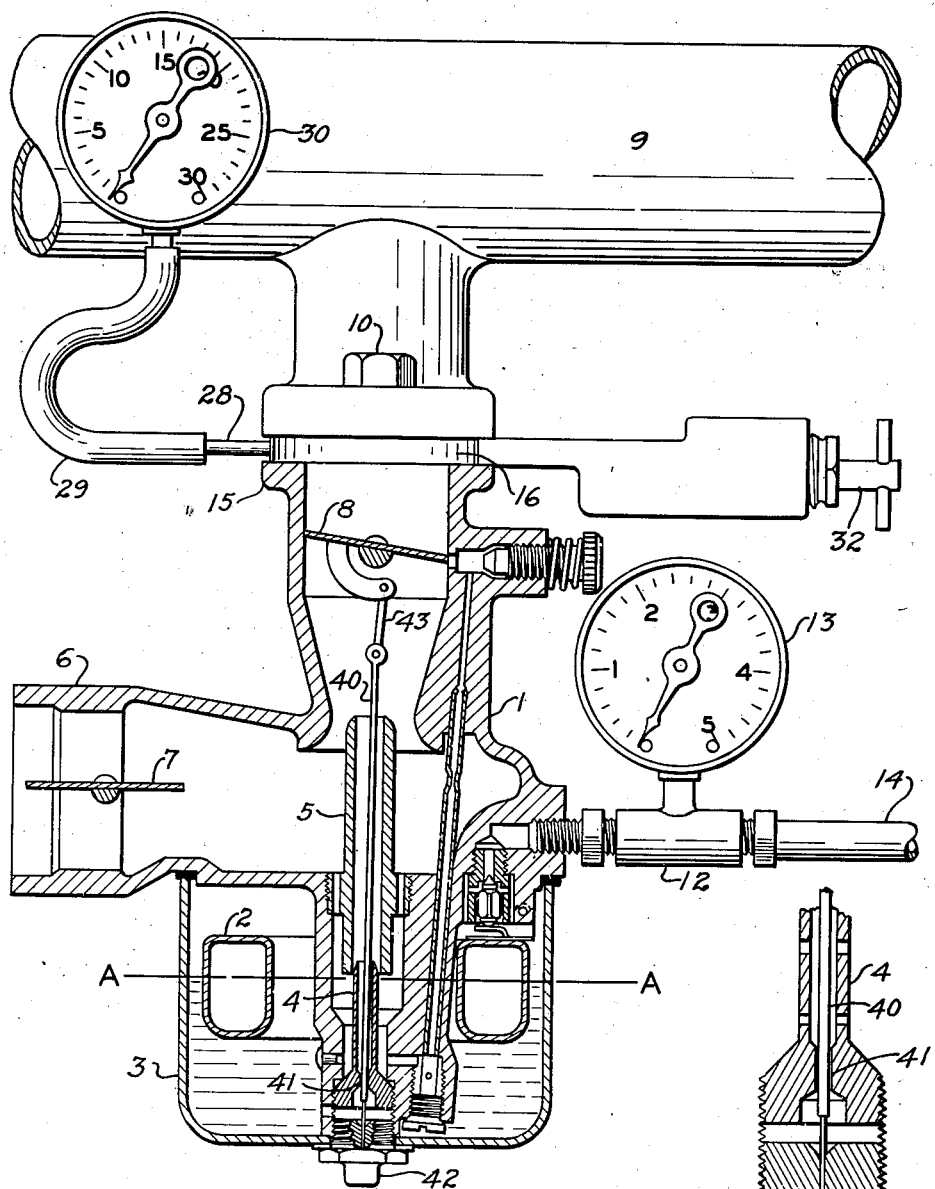
Fig. 1 is a side elevation illustrating the carburetor mounted on an intake manifold of an internal combustion engine, with the device potioned between the manifold and the carburetor, various parts being broken away and others shown in section.
Figure 2:
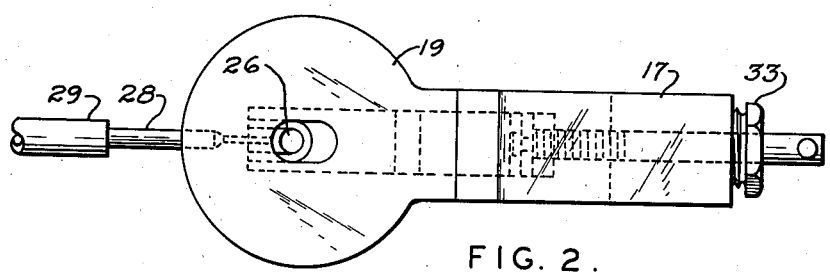
Fig. 2 is a bottom view of the device.

Reference numeral 1 indicates the body portion of an updraft carburetor consisting of the customary float 2 for maintaining gasoline at the level A—A in the float bowl 3, nozzle 4, standpipe 5, air horn 6, choke valve 7, and throttle valve 8. Metering rod 40 extending downwardly through nozzle 4 registers with the restriction 41 and guide plug 42 and is actuated by the throttle valve through linkage 43. All of the above parts and their functions are well known in the art and in themselves form no part of the invention.

The carburetor, as a unit, is mounted on the intake manifold 9 by the bolts 10 through flanges 11 and 15.

Inserted in the gasoline line 14 is a T-shaped fitting 12 attached to which is a liquid flow gauge 13 of any of the well known types of flow meters, so construction as to measure the flow of gasoline through the conduit 14 to the carburetor.

Clamped between the intake manifold flange 11 and the carburetor flange 15 is a portion of a restriction device generally indicated at 16 from which extends a suction tube 28 having a flexible conduit 29 connected thereto which leads to a vacuum gauge 30 of standard and well known design. The gauge 30 may be of the type shown or in the form of either open or closed end manometer as desired.

Figure 7:
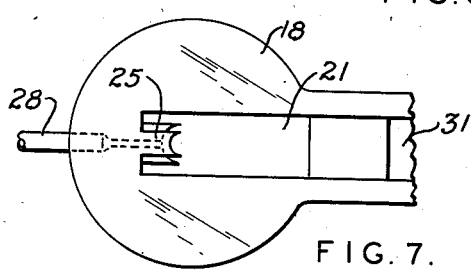
Fig. 7 is a plan view of the center plate with a portion broken away.

The restriction device 16 and its component parts are clearly illustrated in Figures 2, 3, 4, 5, 6 and 7. The device 16 comprises a main body 17 having an extension plate 18, top plate 20 and a bottom plate 19 with their contacting surfaces sealed by any suitable method. Extension plate 18 is provided with an opening 21 as shown in Fig. 7 into which a portion 22 of slide or throttle member 23 moves and end members 24 coact with boss 25 projecting into the opening 21 to form an orifice 26 that may be varied in size. It is to be noted that the orifice formed is of greater cross section area on the intake manifold side than that exposed to the carburetor. On the other end of throttle member 23 a slotted flange 27 is formed to depend into the recess 31 in body 17. Flange 27 receives the headed end of throttle screw 32 which is threaded longitudinally through the body 17 and sealed by the packing gland and nut 33. Plates 19 and 20 are provided with apertures 34 and 35 corresponding in size with the largest orifice 26 exposed to the respective plates. By rotating the throttle screw 32, throttle plate 23 is moved longitudinally between the plates 19 and 20 and the orifice 26 may thereby be varied in size. The suction tube 28 is rigidly secured to the extension plate 18 and is in communication with the larger portion of the orifice 26 by means of duct 36 formed in the extension plate 18 and is exposed to the high vacuum of the intake manifold.

Figure 3:
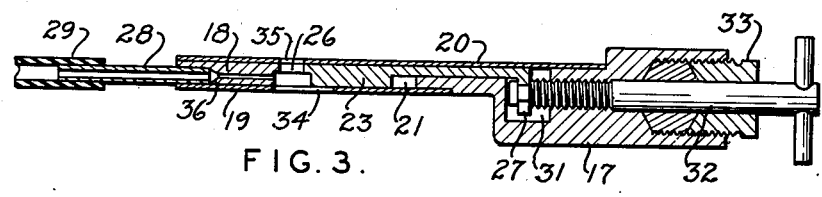
Fig. 3 is a longitudinal section taken on line 3—3 of Fig. 4.
Figure 4:
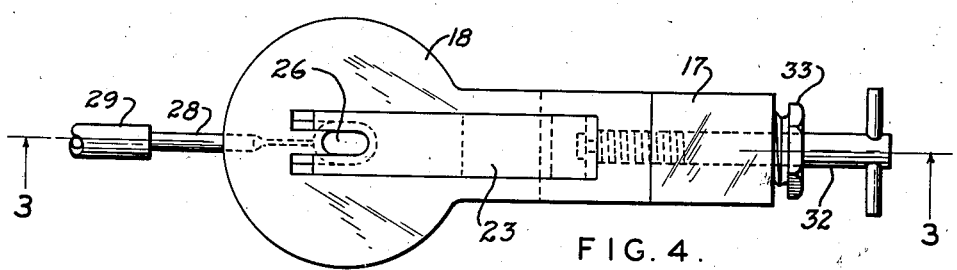
Fig. 4 is a plan view of the device with the plate removed.
Figure 6:
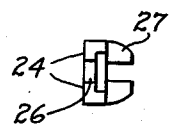
Fig. 6 is an end view of the throttle plate.
Figure 5:
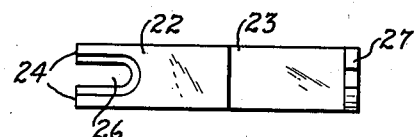
Fig. 5 is a bottom view of the throttle plate.

Upon reference to Fig. 3, it will be noted that the outlet passageway 36 is positioned adjacent the most restricted portion of the orifice 26 so as to be substantially effective in accordance with the volume of mixture flowing through said passage as well as by the suction existing in the intake manifold of the engine. In this manner, I can obtain an approximate determination of the quantity of mixture flowing to the engine.

It is a well known fact that the volume of mixture entering the intake manifold of an engine is dependent upon the size of the opening and the pressure difference between the pressure in the intake manifold and the atmospheric pressure. A new carburetor is calibrated to deliver a mixture of a fixed quality dependent on the balanced combination of size and shape of the air horn, size and position of the nozzle, height of liquid level and size of fuel bowl vent. In other words the quality of mixture is fixed by the manufacturing standard of the manufacturer and the quantity of mixture delivered is dependent upon restriction and the pressure differential between the intake manifold and the atmosphere.

Carburetors are manufactured to very close limits and flow tested before being released, therefore, each carburetor has met the manufacturer's standard as to quality of mixture and quantity of mixture flow. Any carburetor, after being repaired, should function as a new carburetor and should meet the standards set up by the manufacturer in order to insure proper operation of an engine.

This invention is particularly valuable in spot checking a repaired carburetor to ascertain if it has been restored to the manufacturer's specification.

To perform the operation of checking or spot flowing a carburetor is as follows: It is assumed that the engine has been tuned other than the carburetor. The idle system and liquid level may be checked and set in the usual well known manner without the use of this invention. The part throttle position may be checked by accurately opening the throttle a given distance and positioning the device between the carburetor and the intake manifold as illustrated in Fig. 1 and starting the engine.

Throttle screw 32 is then rotated to vary the orifice 26 until the hand of gauge 30 is brought to a predetermined point corresponding to the reading of a new carburetor within the manufacturer's specified limits. The flow meter is then noted and if any one of the combination of parts governing the quality of mixture does not meet the specifications, a difference in flow of fuel will be noted. If the nozzle or bowl vent is restricted the reading on the flow gauge will indicate a lean mixture. If the air bleeds are restricted or if the bowl vent or nozzle has been enlarged, the reading on the flow gauge will indicate a too rich mixture. When either of these readings is encountered it is a clear indication that the carburetor is not up to the manufacturer's standards and will not function as originally designed throughout the part throttle range.

To test the carburetor in wide open throttle position the carburetor throttle is held open and the throttle screw 32 is then rotated to move throttle member 23 inwardly, thereby forming the smallest possible orifice 26 which is calibrated to a predetermined size. A reading is then taken on the vacuum gauge. Corresponding to the reading on the vacuum gauge, a known reading should be obtained on the liquid flow gauge, if not, the reading will indicate a too lean or too rich mixture, and the cause can then be readily ascertained. These two comparative readings are sufficient to determine whether the carburetor will flow properly over the entire range calibrated by the manufacturer.

By using a restriction as described between the carburetor and the intake manifold, a much higher vacuum reading is obtained at wide open throttle position and the engine will be throttled so as not be injured if left running for a short period of time.

It will be understood that the invention is susceptible to many modifications, and, accordingly, we do not wish to be limited in our protection except as set forth in the accompanying claim.

We claim:

The method of testing a carburetor of the type, in which the mixture is regulated in accordance with the position of the throttle valve, which comprises mounting the carburetor on an engine, running the engine without load so as to apply the engine suction to the carburetor and draw fuel mixture therefrom, setting the throttle valve in a predetermined open position, restricting the flow of mixture from the carburetor to a predetermined rate corresponding to the flow rate normally produced with the throttle in a more nearly closed position, determining the rate of flow of liquid fuel to the carburetor, and comparing said last rate to the corresponding rate obtained from a properly functioning carburetor with its throttle in said position and delivering mixture at the same rate.

WILLIAM M. EWART.
JOHN H. KLASEY.